United States Patent
Kanou

(10) Patent No.: US 9,755,690 B2
(45) Date of Patent: Sep. 5, 2017

(54) MULTIBAND WIRELESS COMMUNICATION METHOD AND MULTIBAND WIRELESS COMMUNICATION APPARATUS

(75) Inventor: Hideto Kanou, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 825 days.

(21) Appl. No.: 12/295,482

(22) PCT Filed: Mar. 28, 2007

(86) PCT No.: PCT/JP2007/056693
§ 371 (c)(1),
(2), (4) Date: Sep. 15, 2009

(87) PCT Pub. No.: WO2007/119568
PCT Pub. Date: Oct. 25, 2007

(65) Prior Publication Data
US 2010/0238844 A1  Sep. 23, 2010

(30) Foreign Application Priority Data
Mar. 30, 2006  (JP) ................. 2006-093081

(51) Int. Cl.
*H04B 1/04* (2006.01)
*H04B 1/52* (2015.01)
*H04B 1/00* (2006.01)

(52) U.S. Cl.
CPC .............. *H04B 1/52* (2013.01); *H04B 1/006* (2013.01)

(58) Field of Classification Search
USPC ................................... 455/126, 127.1–127.5
See application file for complete search history.

(56) References Cited

U.S. PATENT DOCUMENTS

| 7,050,772 B2 * | 5/2006 | Herzberg | H04B 1/04 455/126 |
| 7,444,123 B2 * | 10/2008 | Yamawaki | H04B 1/04 330/291 |
| 7,496,360 B2 * | 2/2009 | Sindhwani | H04W 88/06 370/310 |
| 7,546,107 B2 * | 6/2009 | Noda | H04B 1/126 455/283 |

(Continued)

FOREIGN PATENT DOCUMENTS

| JP | 2004-012600 | 1/2004 |
| JP | 2004-012655 | 1/2004 |
| JP | 2004-198809 | 7/2004 |

OTHER PUBLICATIONS

Chinese language office action dated Oct. 26, 2011 and its English language translation for corresponding Chinese application 200780011510.7.

(Continued)

*Primary Examiner* — Lana N Le
(74) *Attorney, Agent, or Firm* — Studebaker & Brackett PC

(57) ABSTRACT

A multiband wireless communication method for performing a reception operation in a second frequency band while performing a transmission operation in a first frequency band selectively changes a gain characteristic of a power amplifier (1 or 2) for performing the transmission operation so that gain is lowered in the second frequency band, based on performing of the reception operation.

3 Claims, 19 Drawing Sheets

| Mode/<br>Data Rate | frequency band | transmission level threshold [dBm] | |
|---|---|---|---|
| | | 800MHz band | 2GHz band |
| IS95B | ~ 64.0 [Kbps] | 9.0 | 15.0 |
| 1x | ~ 153.6 [Kbps] | 8.5 | 14.5 |
| 1xEV-DO | ~ 153.6 [Kbps] | 8.5 | 14.5 |
| | ~ 307.2 [Kbps] | 8.0 | 14.0 |
| | ~ 614.4 [Kbps] | 7.5 | 13.5 |
| | ~ 1228.8 [Kbps] | 7.0 | 13.0 |
| | ~ 2457.6 [Kbps] | 6.5 | 12.5 |

(56) References Cited

U.S. PATENT DOCUMENTS

| | | | | |
|---|---|---|---|---|
| 8,634,782 B2* | 1/2014 | Asuri | ................... | H04B 1/0064 455/101 |
| 8,670,726 B2* | 3/2014 | Poulin | .................. | H04B 1/0064 455/553.1 |
| 2002/0177465 A1* | 11/2002 | Robinett | ....................... | 455/552 |
| 2004/0229579 A1* | 11/2004 | Tsutsui et al. | ............. | 455/127.2 |
| 2005/0231794 A1* | 10/2005 | Funaki | .......................... | 359/291 |
| 2006/0030356 A1* | 2/2006 | Haub | ............... | H04W 52/0245 455/553.1 |
| 2006/0194551 A1* | 8/2006 | Sato | ...................... | H03F 1/0205 455/127.1 |
| 2007/0010218 A1* | 1/2007 | Monroe et al. | ............ | 455/127.1 |
| 2008/0176594 A1* | 7/2008 | Song | .................... | H04W 16/14 455/522 |
| 2014/0135056 A1* | 5/2014 | Wang | .................. | H04B 7/0617 455/522 |

OTHER PUBLICATIONS

Chinese language office action dated Jul. 30, 2012 and its English language translation issued in corresponding Chinese application 200780011510.7.

Chinese language office action dated Feb. 21, 2013 and its English language translation issued in corresponding Chinese application 200780011510.7.

* cited by examiner

FIG. 5

| Hybrid operation / frequency band | comparing voltage [V] | |
|---|---|---|
| | 800MHz band | 2GHz band |
| ON | 1.0 | 1.5 |
| OFF | Vbatt | Vbatt |

Vbatt : battery voltage

FIG. 7

| Hybrid operation \ frequency band | comparing voltage [V] ||
| --- | --- | --- |
|  | 800MHz band | 2GHz band |
| ON | 1.0 : Vdc=1.5<br>Vbatt − 0.5 : Vdc=Vbatt | Vbatt − 0.5 |
| OFF | Vbatt | Vbatt |

Vdc : DC/DC converter output voltage
Vbatt : battery voltage

FIG. 11

| frequency [MHz] \ temperature [°C] | transmission level threshold [dBm] | | |
|---|---|---|---|
| | −20~10 | 10~40 | 40~60 |
| 898 ~ 901 | 4.5 | 4.0 | 3.5 |
| 915 ~ 918 | 5.0 | 4.5 | 4.0 |
| 918 ~ 921 | 5.5 | 5.0 | 4.5 |
| 921 ~ 925 | 6.0 | 5.5 | 5.0 |

FIG. 13

| Mode/ Data Rate | frequency band | transmission level threshold [dBm] | |
|---|---|---|---|
| | | 800MHz band | 2GHz band |
| IS95B | ~ 64.0 (Kbps) | 9.0 | 15.0 |
| 1x | ~ 153.6 (Kbps) | 8.5 | 14.5 |
| 1xEV-DO | ~ 153.6 (Kbps) | 8.5 | 14.5 |
| | ~ 307.2 (Kbps) | 8.0 | 14.0 |
| | ~ 614.4 (Kbps) | 7.5 | 13.5 |
| | ~ 1228.8 (Kbps) | 7.0 | 13.0 |
| | ~ 2457.6 (Kbps) | 6.5 | 12.5 |

FIG. 15

| | reception level threshold [dBm] | |
|---|---|---|
| QoS ＼ frequency band | 800MHz band | 2GHz band |
| QoS ON | −80.0 | −86.0 |
| QoS OFF | −85.0 | −91.0 |

MULTIBAND WIRELESS COMMUNICATION METHOD AND MULTIBAND WIRELESS COMMUNICATION APPARATUS

CROSS REFERENCE TO RELATED APPLICATION

This application claims priority to and the benefit of Japan Patent Application No. 2006-93081 filed on Mar. 30, 2006, the entire content of which is incorporated herein by reference.

TECHNICAL FIELD

The present invention relates to a multiband wireless communication method and multiband wireless communication apparatus.

RELATED ART

In recent years, a plurality of systems in compliance with standards exists in wireless communication apparatus such as a cellular phone and the like. For example, in Japan, cellular phone systems such as PDC system, CDMA system, PHS system are spread.

A wireless communication apparatus is generally constructed to correspond to one standard. However, for example in the latest cellular phone system, since there was the lack of frequency band allocated to each system due to spread of cellular phones, it has been considered to design a cellular phone to operate on multi-bands. Moreover, in order to provide stable and high performance services, it has been considered to design a cellular phone to operate in multi-modes by performing handoff between different frequency bands and shift of operation modes (for example, 1× mode and 1×EVDO) and the like.

Such wireless communication apparatus capable of operating on multi-bands or multi-modes are disclosed, for example, in Japanese Unexamined Patent Publications Nos. 1999-112382 (hereinafter, patent document 1) and 2003-152588 (hereinafter, patent document 2).

The wireless communication apparatus disclosed in patent document 1 is a dual-band wireless communication apparatus with a small-sized circuit, and comprises a first frequency conversion unit for converting a transmission IF signal to a first transmission signal and for converting a first reception signal to a reception IF signal; and a second frequency conversion unit for converting the first transmission signal to a second transmission signal and for converting a second reception signal to the first reception signal. By controlling a switch according to a control signal, the wireless communication apparatus can switch between an 800 MHz band system that uses the first transmission signal and the first reception signal and 1900 MHz band system that uses the second transmission signal and the second reception signal.

The wireless communication apparatus disclosed in patent document 2 is a communication apparatus using a multiband antenna switching circuit, and comprises a first diplexer 1 having a first transmission terminal, a second transmission terminal and a first common terminal; a second diplexer 2 having a second transmission terminal, a first reception terminal and a second common terminal; and a switching circuit having the first transmission/reception terminal, the second transmission/reception terminal and an antenna terminal, and selectively connecting either the first transmission/reception terminal or the second transmission/ reception terminal to the antenna terminal. The first common terminal is connected to the first transmission/reception terminal, and the second common terminal is connected to the second transmission/reception terminal. And, a notch filter is connected between the antenna terminal and the switching circuit.

Power amplifiers included in transmission unit in such wireless communication apparatus are generally constructed as shown in FIG. 17.

The power amplifier 51 has an input terminal 52, an input matching circuit 53, a front-stage amplifying circuit 54, an inter-stage matching circuit 55, an rear-stage amplifying circuit 56, an output matching circuit 57, an output terminal 58, a power terminal 59, a bias circuit 60 and a reference voltage terminal 61. A transmission signal inputted into the input terminal 52 passes through the input matching circuit 53 and is amplified by the front-stage amplifying circuit 54. And then, it passes through the inter-stage matching circuit 55 and is amplified up to a predetermined power level by the rear-stage amplifying circuit 56. And then, the signal is impedance-matched by the output matching circuit 57, and outputted from the output terminal 58.

To the front-stage amplifying circuit 54 and the rear-stage amplifying circuit 56, for example, in a cellular phone, a predetermined voltage is applied from a DC/DC converter 65 that inputs a battery voltage through the power terminal 59, and a predetermined bias voltage is also applied from the reference voltage terminal 61 through the bias circuit 60. Output voltage of the DC/DC converter 65, voltage of the power terminal 59, is set to an optimum level according to the transmission power of the power amplifier 51 by a control signal from a control unit such as a CPU not shown and the like.

The output matching circuit 57 has an inductor L1 connected in series between an output terminal of the rear-stage amplifying circuit 56 and the output terminal 58 of the power amplifier 51; a strip line SL which is a transmission line; a capacitor C1; an inductor L2 connected between a connection point S1 of the inductor L1 and the strip line SL and the power terminal 59; a capacitor C2 connected between the connection point S1 and ground; a capacitor C3 connected between a connection point S2 of the strip line SL and the capacitor C1 and ground; and a capacitor C4 connected between the power terminal 59 and ground.

When a frequency band of a transmission signal whose power has been amplified by the power amplifier 51 is, for example, 800 MHz band, the output matching circuit 57 is designed to have the maximum gain at 800 MHz band, as shown in FIG. 18.

In two wireless communication apparatus disclosed in above patent documents 1, 2, since a plurality of transmission/reception unit for different bands does not operate simultaneously, the output matching circuit is preferably designed so that the power amplifier included in each transmission unit has the maximum gain at a corresponding band.

Moreover, in the latest mobile communication apparatus, it has been considered to perform a hybrid operation that receives a signal in one band with transmitting/receiving a signal in another band, adding to the above-described multi-bands or multi-modes.

FIG. 19 is a schematic diagram of a main part of multi-band wireless communication apparatus capable of doing a hybrid operation.

The multiband wireless communication apparatus has a CDMA system operating in 800 MHz band (for example, ARIB STD-T53, hereinafter referred to as 800 MHz band system), a CDMA system operating in 2 GHz band (for example, ARIB STD-T64, hereinafter referred to as 2 GHz band system), and a GPS receiving circuit. It employs a diversity system in order to improve the throughput in data communication by the 800 MHz band system and the 2 GHz band system and to execute a hybrid operation.

Particularly allocated frequencies are as follows: in the 800 MHz band system, transmission frequencies are in 898~901 MHz and 915~925 MHz, and reception frequencies are in 843~846 MHz and 860~870 MHz; in the 2 GHz band system, transmission frequencies are in 1920~1980 MHz, and reception frequencies are in 2110~2170 MHz. And, GPS reception frequency is 1575.42 MHz.

In such cellular phone terminal capable of performing a hybrid operation, when a hybrid operation is performed, for example, by driving a secondary reception circuit of 2 GHz band system or GPS reception circuit while voice communication is performed by a primary circuit of 800 MHz band system, frequency components of 2 GHz band system or GPS reception frequency components contained in transmission signals from 800 MHz band system are coupled to the secondary reception circuit of 2 GHz band system or the GPS reception circuit as a noise through a secondary antenna or over isolation of component devices and a substrate, which degrades receiving sensitivity.

In FIG. 19, the primary circuit of the 800 MHz band system has a filter (FIL) 72 for suppressing frequency components of 2 GHz band system and a filter 73 for suppressing GPS reception frequency components, which are connected in series at later stage of the power amplifier 71 composing a transmission unit. A transmission signal amplified up to a predetermined level by the power amplifier 71 passes through filters 72 and 73, duplexer (DPU) 74 and an antenna switch (ANT SW) 75, and is radiated from the primary (main) antenna 76.

The reception unit of the primary circuit of the 800 MHz band system provides a signal received by the main antenna 76 to a low-noise amplifier 77 through an antenna switch 75 and a duplexer 74. The low-noise amplifier 77 low-nose amplifies the received signal in 800 MHz band. And then, an 800 MHz band reception filter 78 filters unnecessary components in the received signal and outputs the result.

Similarly, the primary circuit of the 2 GHz band system has a filter 82 for suppressing frequency components of 800 MHz band system and a filter 83 for suppressing GPS reception frequency components, which are connected in series at later stage of the power amplifier 81 composing a transmission unit. A transmission signal amplified up to a predetermined level by the power amplifier 81 passes through filters 82 and 83, duplexer 84 and the antenna switch 75, and is radiated from the main antenna 76.

The reception unit of the primary circuit of the 2 GHz band system provides a signal received by the main antenna 76 to a low-noise amplifier 87 through an antenna switch 75 and a duplexer 84. The low-noise amplifier 87 low-noise amplifies the received signal in 2 GHz band. And then, a 2 GHz band reception filter 88 filters unnecessary components in the received signal and outputs the result. A connector 89 for measurement is connected to the antenna switch 75 so as to be switchable to the main antenna 76.

A signals received by the secondary (sub) antenna 91 passes through a triplexer (Tri) 92, which separates frequencies, and are provided to a secondary reception circuit of 800 MHz band system having a 800 MHz band reception filter 93 for extracting a received signal in 800 MHz band and a low-noise amplifier 94 for low-noise amplifying the output of the filter 93; a secondary reception circuit of 2 GHz band system having a 2 GHz band reception filter 95 for extracting a received signal in 2 GHz band and a low-noise amplifier 96 for low-noise amplifying the output of the filter 95; and a GPS reception circuit having a GPS reception frequency band reception filter 97 for extracting a received signal in GPS reception frequency band and a low-noise amplifier 98 for low-noise amplifying the output of the filter 97.

According to the cellular phone shown in FIG. 19, when a hybrid operation is performed, for example, by driving the secondary reception circuit of the 2 GHz band system or GPS reception circuit connected to the sub-antenna 91 while voice communication is performed by the primary circuit of 800 MHz band system connected to the main antenna 76, frequency components of 2 GHz band system and GPS reception frequency components which are generated in the power amplifier 71 of the 800 MHz band system are suppressed by filters 72 and 73, respectively. Accordingly, coupling to the secondary reception circuit of the 2 GHz band system and the GPS reception circuit connected to the sub-antenna 91 is reduced, so that it is possible to prevent degradation of receiving sensitivity.

Similarly, when a hybrid operation is performed by driving the secondary reception circuit of the 800 MHz band system or GPS reception circuit connected to the sub-antenna 91 while voice communication is performed by the primary circuit of 2 GHz band system connected to the main antenna 76, frequency components of 800 MHz band system and GPS reception frequency components which are generated in the power amplifier 81 of the 2 GHz band system are suppressed by filters 82 and 83, respectively. Accordingly, coupling to the secondary reception circuit of the 800 MHz band system and GPS reception circuit connected to the sub-antenna 91 is reduced, so that it is possible to prevent degradation of receiving sensitivity.

DISCLOSURE OF THE INVENTION

Problems to be Solved by the Invention

However, in the cellular phone shown in FIG. 19, as the transmission unit of the 800 MHz band system is provided with the filter 72 for suppressing frequency components of 2 GHz band system and the filter 73 for suppressing GPS reception frequency components, and as the transmission unit of the 2 GHz band system is provided with the filter 82 for suppressing frequency components of 800 MHz band system and the filter 83 for suppressing GPS reception frequency components, a number of component devices are needed, which may lead to increases in size and costs of the apparatus as a whole. Moreover, power amplifiers 71, 81 are needed to amplify power in order to compensate insertion loss by filters 72, 73 and filters 82, 83, so that power consumption is increased and battery life is shortened.

Similar problems exist in other mobile and fixed terminals capable of performing a hybrid operation for receiving a signal in one band while transmitting/receiving a signal in another band, as well as above described cellular phones.

In the view of above problems, an object of the present invention is to provide a multiband wireless communication method capable of performing hybrid operation that can reduce insertion loss of circuit, and is suitable to achieve a wireless communication apparatus having small size, low price and reduced power consumption, and a multiband wireless communication apparatus.

SUMMARY OF THE INVENTION

To achieve the above object, the multiband wireless communication method according to claim 1 performs a reception operation in a second frequency band while performing a transmission operation in a first frequency band, and has a characteristic in that a gain characteristic of a power amplifier for performing the transmission operation is changed so that gain is lowered in the second frequency band, based on performing of the reception operation.

According to the invention of claim 2, in the multiband wireless communication method of claim 1, a gain characteristic of the power amplifier is changed so that gain is lowered in the second frequency band, by being synchronized with performing the reception operation.

According to the multiband wireless communication method of claim 1, when the reception operation is performed and a set transmission level of the power amplifier is above a transmission level threshold which is previously set, a gain characteristic of the power amplifier is changed so that gain is lowered in the second frequency band.

According to the multiband wireless communication method of claim 1, the transmission level threshold is set based on a data rate of a transmission signal by the power amplifier.

To achieve the above object, a multiband wireless communication apparatus according to claim 3 has a transmission unit comprising a power amplifier, and a reception unit for receiving a signal in a frequency band which is different from a frequency band of a transmission signal by the transmission unit, and which selectively performs a reception operation by the reception unit while performing a transmission operation by the transmission unit, and has a characteristic in that it comprises a matching characteristic changing circuit provided to be selectively connectable to an output matching circuit of the power amplifier through a switching unit and for lowering gain of the power amplifier in a frequency band of the reception unit; and a control unit for controlling the switching unit based on a reception operation by the reception unit.

To achieve the above object, a multiband wireless communication apparatus according to the present invention comprises: a main antenna and a sub-antenna; a plurality of transmission/reception unit connected to the main antenna and operating in different frequency bands by being selectively driven; a plurality of reception unit connected to the sub-antenna and operating in different frequency bands; a matching characteristic changing circuit provided to be selectively connectable to an output matching circuit of a power amplifier provided to each transmission unit of the plurality of transmission/reception unit through respective switching unit, and for lowering gain in a frequency band which is different from a frequency band of a transmission unit where the power amplifier is provided, among frequency bands of the plurality of reception unit connected to the sub-antenna; and a control unit for controlling the switching unit corresponding to the power amplifier of the transmission/reception unit, based on a selective driving of the plurality of transmission/reception unit and a reception operation of the reception unit in a frequency band which is different from a frequency hand of the transmission/reception unit.

According to the present invention of the multiband wireless communication apparatus, the control unit controls the switching unit based on comparison of a set transmission level of the power amplifier and a transmission level threshold which is previously set so that the switching unit is turned on when the set transmission level is above the transmission level threshold.

According to the present invention of the multiband wireless communication apparatus, when transmission is performed by the transmission unit on a condition that the switching unit is turned off, the transmission level threshold is set based on a measured value of an amount of transmission noise included in a reception signal by the reception unit in a frequency band which is different from a frequency band of the transmission unit.

According to the present invention of the multiband wireless communication apparatus, the transmission level threshold is set based on a data rate of a transmission signal by the transmission unit.

According to the present invention of the multiband wireless communication apparatus, each transmission/reception unit is controlled based on a reception level or a reception C/N of a reception signal in a frequency band of the transmission/reception unit so that a set transmission level of the corresponding power amplifier is increased when the reception level or the reception C/N is small, and the control unit controls the switching unit based on comparison of a reception level or a reception C/N of a reception signal in a frequency band of the transmission/reception unit and a corresponding threshold which is previously set so that the switching unit is turned on when the reception level or the reception C/N is below the threshold.

According to the present invention of the multiband wireless communication apparatus, each transmission/reception unit is controlled based on whether there is QoS control in a frequency band of the transmission/reception unit so that a set transmission level of the corresponding power amplifier is increased when the QoS control is performed, and the control unit controls the switching unit based on comparison of a reception level of a reception signal in a frequency hand of the transmission/reception unit and a corresponding threshold which is previously set according to whether there is QoS control so that the switching unit is turned on when the reception level is below the threshold.

According to the present invention of the multiband wireless communication apparatus, the switching unit has a semiconductor switch.

According to the present invention of the multiband wireless communication apparatus, the semiconductor switch is composed of a PIN diode.

Effect of the Invention

According to the present invention, when the multiband wireless communication apparatus performs a hybrid operation for performing a reception operation in the second frequency band while performing a transmission operation in the first frequency band, since a gain characteristic of a power amplifier for performing the transmission operation is changed based on performing of the reception operation so that gain is lowered in the second frequency band where the reception operation is performed, there is no need to provide a filter for suppressing unnecessary components in the second frequency band at rear-stage of the power amplifier and it is possible to reduce noise in the second frequency band where the reception operation is performed. Therefore, according to the present invention, it is possible to reduce the number of filters in the circuit, so that insertion loss of circuit is reduced. Moreover, it is possible to achieve a wireless communication apparatus having small size, low price and reduced power consumption.

BRIEF DESCRIPTION OF THE DRAWINGS

FIG. 5 shows a comparing voltage table according to the first embodiment;

FIG. 7 shows a comparing voltage table according to the second embodiment;

FIG. 11 shows a transmission level threshold table according to the fourth embodiment;

FIG. 13 shows a transmission level threshold table according to the fifth embodiment;

FIG. 15 shows a reception level threshold table according to the sixth embodiment;

Figure 1:
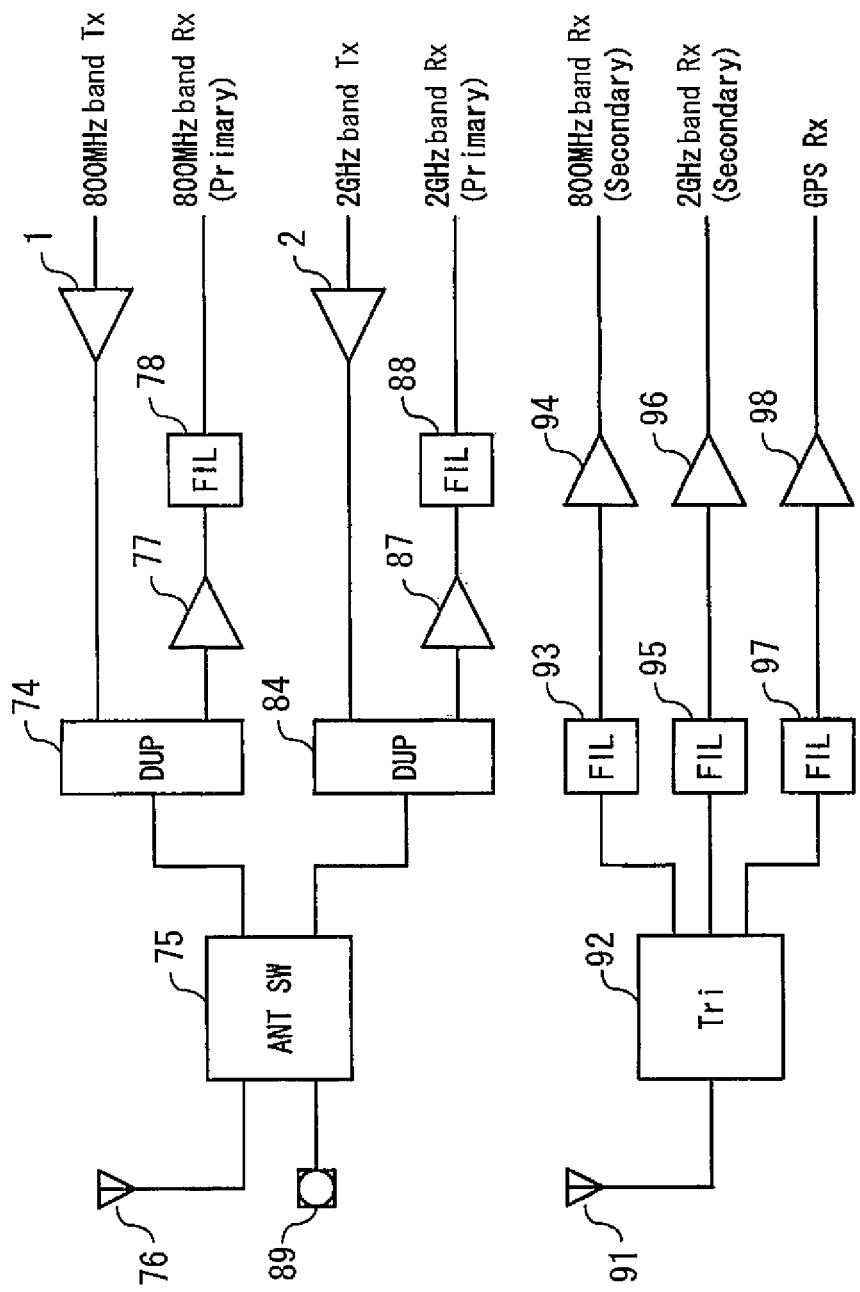
FIG. 1 is a block diagram of a main part of a cellular phone as a multiband wireless communication apparatus according to the first embodiment of the present invention.

REFERENCE SYMBOLS 1, 2 power amplifier
11, 21 matching characteristic changing circuit
12 comparing terminal
15, 25 control unit
D1 PIN diode
22 control signal terminal
52 input terminal
53 input matching circuit
54 front-stage amplifying circuit
55 inter-stage matching circuit
56 rear-stage amplifying circuit
57 output matching circuit
58 output terminal
59 power terminal
60 bias circuit
61 reference voltage terminal
65 DC/DC converter
74, 84 duplexer
75 antenna switch
76 main antenna
77, 87, 94, 96, 98 low-noise amplifier
78, 93 800 MHz band reception filter
88, 95 2 GHz band reception filter
97 GPS reception frequency band reception filter
89 connector for measurement
91 sub antenna
92 triplexer

BEST MODE FOR CARRYING OUT THE INVENTION

Preferred embodiments of the present invention will now be described with reference to the accompanying drawings.

First Embodiment

FIG. 1 is a block diagram of a main part of a cellular phone as a multiband wireless communication apparatus according to the first embodiment.

Figure 19:
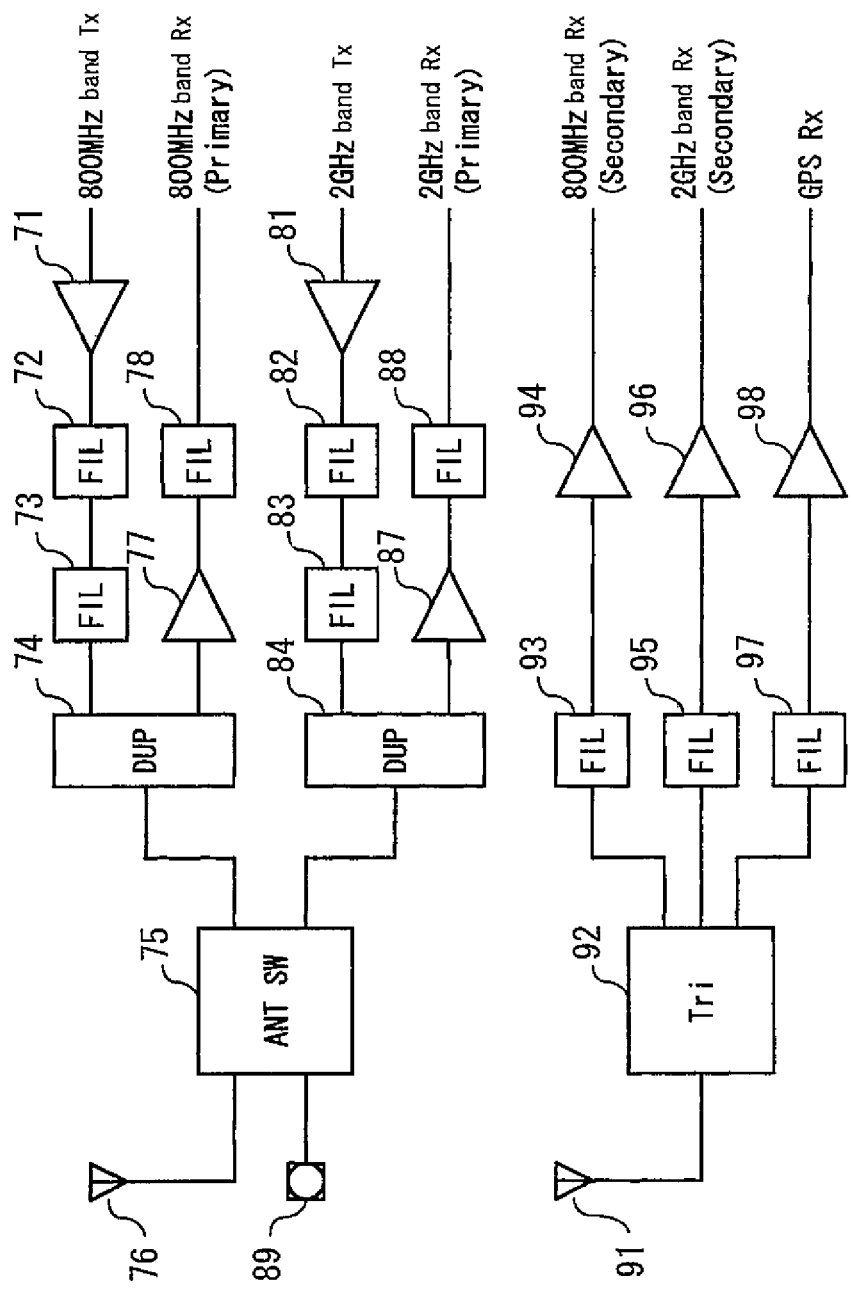
FIG. 19 is a block diagram of a main part of a cellular phone as a multiband wireless communication apparatus capable of performing hybrid operation.

In this embodiment, as compared to the cellular phone of FIG. 19, a power amplifier 1 in a primary circuit of an 800 MHz band system and a power amplifier 2 in a primary circuit of a 2 GHz band system are appropriately designed, so that the cellular phone can omit not only the filter 72 for suppressing frequency components of the 2 GHz band system and the filter 73 for suppressing GPS reception frequency components in the primary circuit of the 800 MHz band system shown in FIG. 19, but also the filter 82 for suppressing frequency components of the 800 MHz band system and the filter 83 for suppressing GPS reception frequency components in the primary circuit of the 2 GHz band system. In FIG. 1, component devices for performing the same operations with those in FIG. 19 have the same reference numerals, and will not be discussed in detail.

Figure 2:
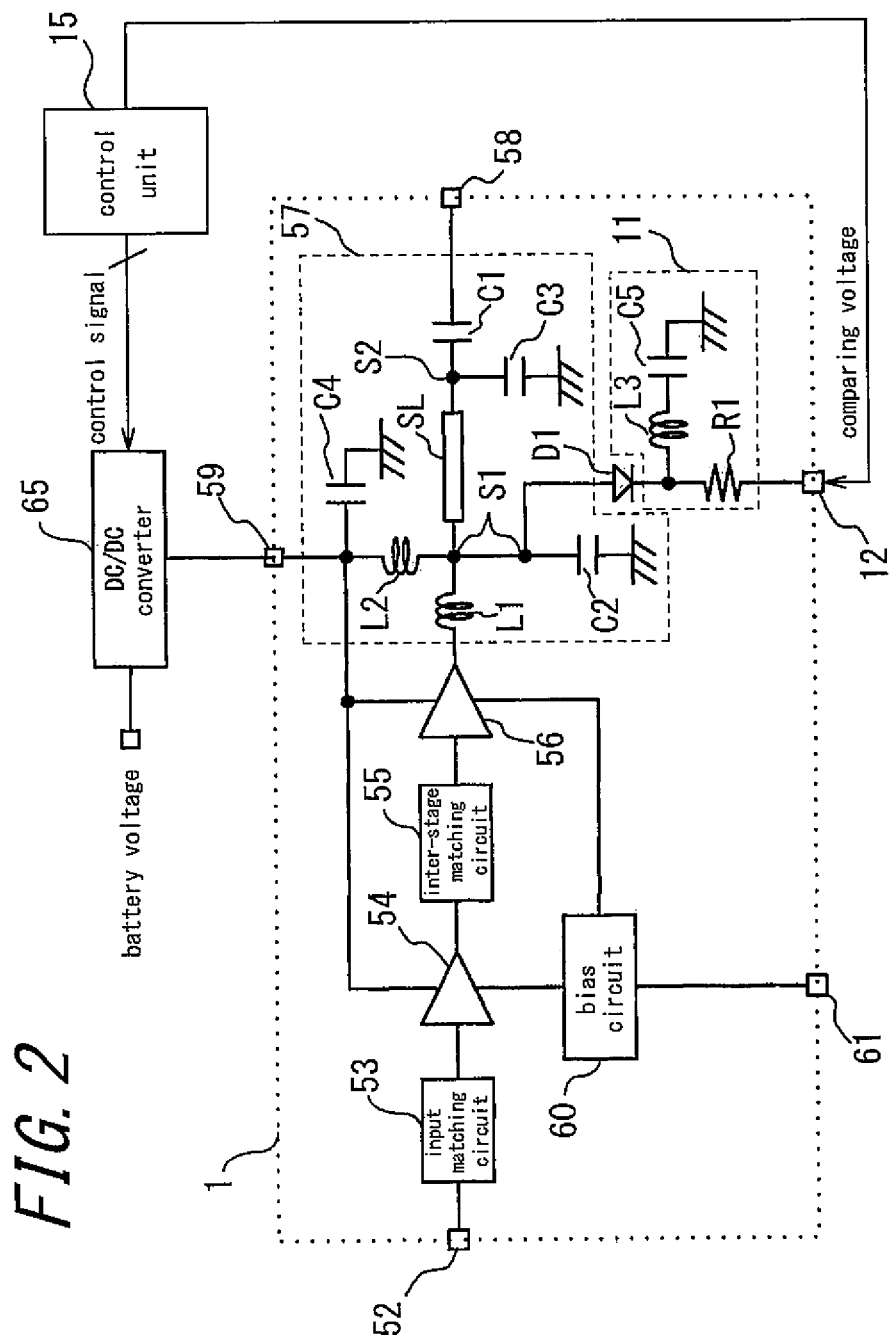
FIG. 2 is a circuit diagram of the power amplifier in the primary circuit of the 800 MHz band system shown in FIG. 1.

FIG. 2 is a circuit diagram of the power amplifier 1 in the primary circuit of the 800 MHz band system shown in FIG. 1. In this embodiment, the power amplifier 1 has a matching characteristic changing circuit 11 that is selectively connectable to the output matching circuit 57 of the power amplifier 51 shown in FIG. 17 through a PIN diode D1 that is a switching unit.

The matching characteristic changing circuit 11 has a current limiting resistor R1, an inductor L3, and a capacitor C5. An anode terminal of the PIN diode D1 is connected to a connection point S1 of an inductor L1 and a strip line SL. A cathode terminal of the PIN diode D1 is connected to ground through the inductor L3 and the capacitor C5, and also connected to a comparing terminal 12 through the current limiting resistor R1.

The comparing terminal 12 is connected to a control unit 15 composed of a CPU and the like. The control unit 15 applies a predetermined comparing voltage to the comparing terminal 12 depending on a hybrid operation, and selectively connects the matching characteristic changing circuit 11 to the output matching circuit 57 by controlling the PIN diode D1 to be turned on/off based on potential difference between output voltage of a DC/DC converter 65 applied to a power terminal 59 and comparing voltage applied to the comparing terminal 12. When the PIN diode D1 is turned on, the power amplifier 1 changes its matching characteristic, which is a gain characteristic, and reduces gain in the reception band (2110~2170 MHz) of the 2 GHz band system and the GPS reception band (1575.42 MHz).

When the 800 MHz band system transmits a signal using the power amplifier 1, and if the amount of coupling signal in the reception band (2110~2170 MHz) of the 2 GHz band system, and coupled to an input terminal of a low-noise amplifier 96 that is a secondary receiving circuit of the 2 GHz band system shown in FIG. 1 is Nr, the Nr needs to be sufficiently lower than thermal noise (−174 [dBm]).

Assumed that: Nr is −184 [dBm]; attenuation in the reception band (2110~2170 MHz) by the 2 GHz band reception filter 95 is 3 dB; attenuation in the same reception band by the triplexer 92 is 0.5 dB; isolation between the main antenna 76 and the sub-antenna 91 is 10 dB; insertion loss of the antenna switch 75 is 0.5 dB; attenuation in the reception band (2110~2170 MHz) by the duplexer 74 is 15 dB; and noise at a transmission terminal of the duplexer 74 is Nt, the Nt is calculated by following equation 1.

$$Nt = -184 - (-3) - (-0.5) - (-10) - (-0.5) - (-15) \quad \text{[Equation 1]}$$
$$= -155 [dBm]$$

Figure 17:
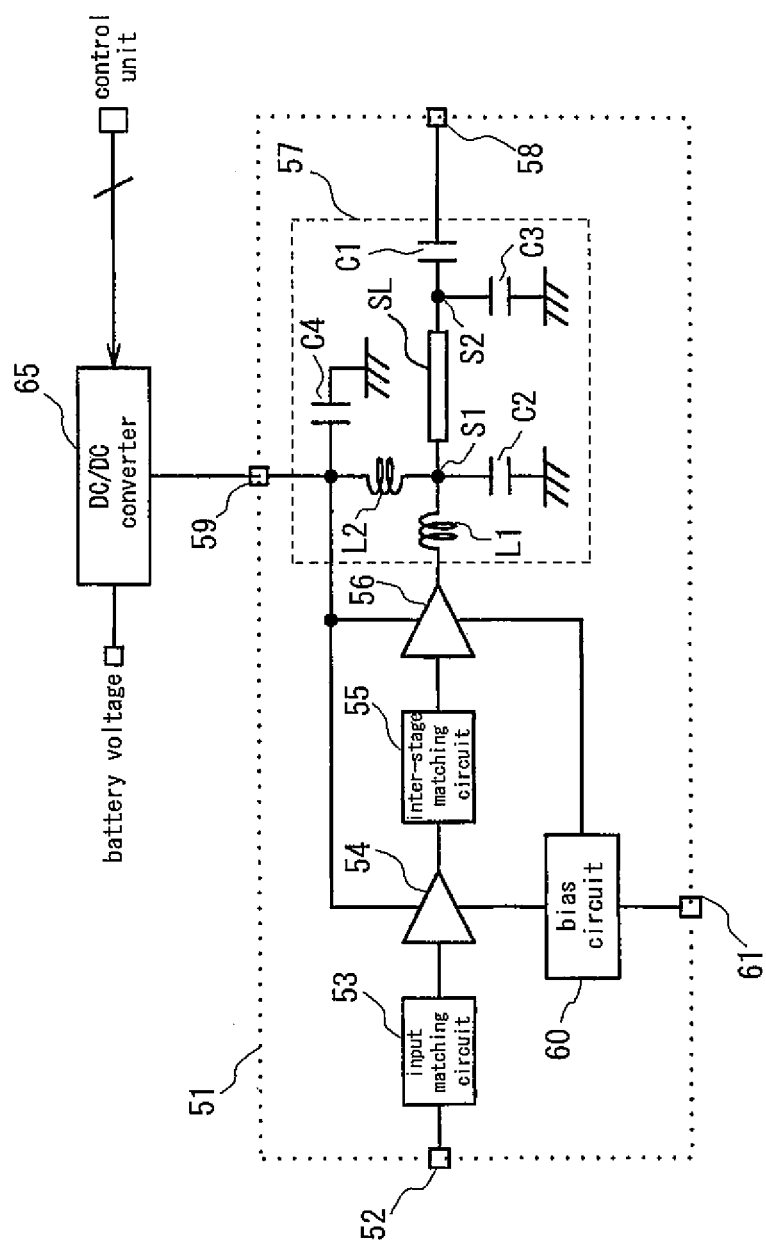
FIG. 17 shows a configuration of a conventional power amplifier.

On the other hand, in the power amplifier 1 in 800 MHz band shown in FIG. 2, if the PIN diode D1 is turned off and the matching characteristic changing circuit 11 is not connected to the output matching circuit 57, the power amplifier 1 has the same construction with the power amplifier 51 shown in FIG. 17, and it is designed so that noise in the reception band is generally about −140 [dBm/Hz].

In this embodiment, values of inductor L3 and capacitor C5 in the matching characteristic changing circuit 11 are determined so that the noise Nt at the transmission terminal of the duplexer 74 shown in FIG. 1 is below −155 [dBm] when the PIN diode D1 is turned on and the matching characteristic changing circuit 11 is connected to the output matching circuit 57.

Figure 3:
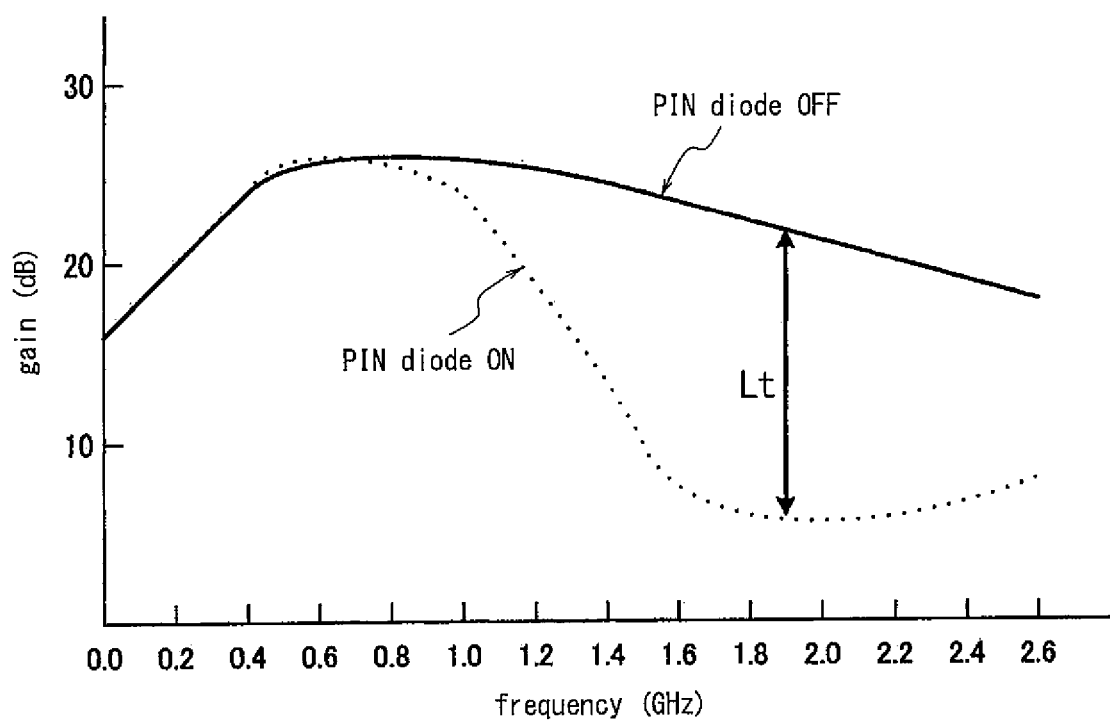
FIG. 3 shows a gain characteristic of the power amplifier shown in FIG. 2.
Figure 18:
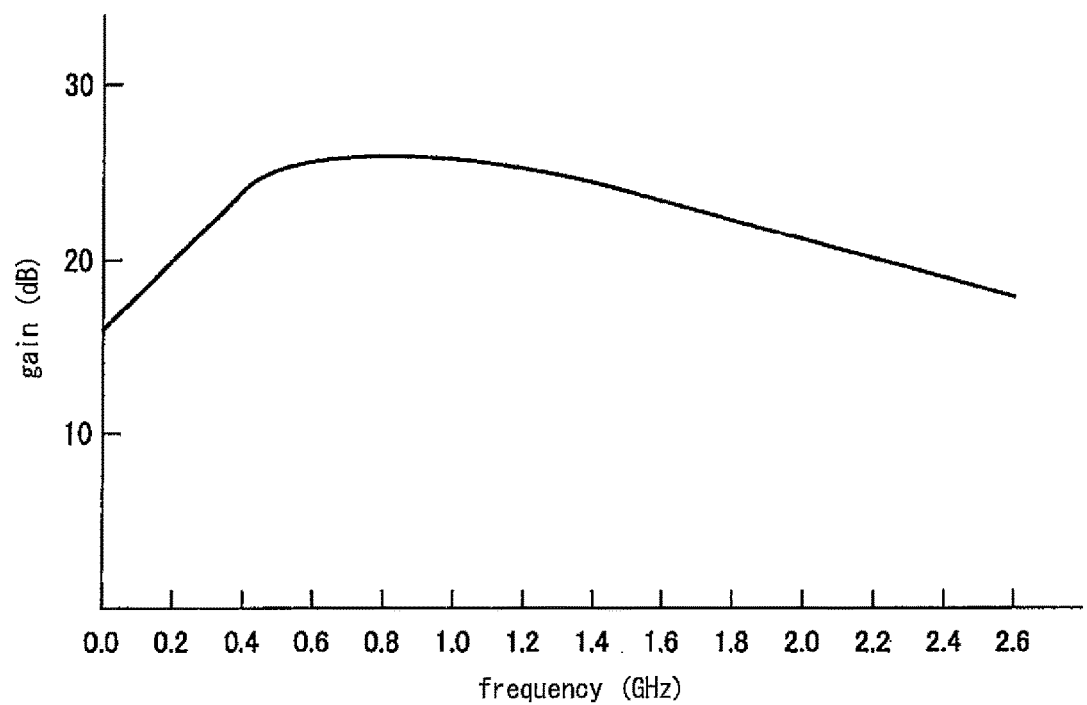
FIG. 18 shows a gain characteristic of the conventional power amplifier.

With this construction, as shown in FIG. 3, when the PIN diode D1 is turned off, the gain characteristic of the power amplifier 1 becomes the same with that of FIG. 18 as shown by a solid line. And, when the PIN diode D1 is turned on, the power amplifier 1 has the gain characteristic shown by a broken line. In other words, by turning on the PIN diode D1, the power amplifier 1 can have a sufficient gain in the 800 MHz band system, and also achieve a reduced amount Lt above 15 dB in gain at the reception band (2110~2170 MHz) of the 2 GHz band system as compared to the gain when the PIN diode D1 is turned off. Moreover, the power amplifier 1 can reduce the gain in GPS reception band (1575.42 MHz) sufficiently.

The power amplifier 2 in the primary circuit of the 2 GHz band system shown in FIG. 1, although not shown in detail, has a matching characteristic changing circuit that is selectively connectable to its output matching circuit through a PIN diode, similarly to the power amplifier 1. The control unit 15 controls the PIN diode to be turned on/off based on a hybrid operation, which changes a gain characteristic of the power amplifier 2. The matching characteristic changing circuit of the power amplifier 2 is constructed so that a sufficiently reduced amount can be obtained in the reception band (843~870 MHz) of 800 MHz band system and the GPS reception band (1575.42 MHz).

Undesired transmission noises generated in above-described power amplifiers 1, 2 are varied with transmission power. Accordingly, if the transmission power is decreased, the transmission noise is also reduced. As the result, when the hybrid operation is performed, amount of transmission noise coupled to the low-noise amplifier 96 and low-noise amplifier 94 in the secondary reception circuit of 2 GHz band system and 800 MHz band system, or the low-noise amplifier 98 in the GPS reception circuit is reduced, so that degradation in sensitivity due to coupling of transmission noise is negligible. In other words, there is no need to change matching condition of the power amplifier 1 or the power amplifier 2.

Figure 4:
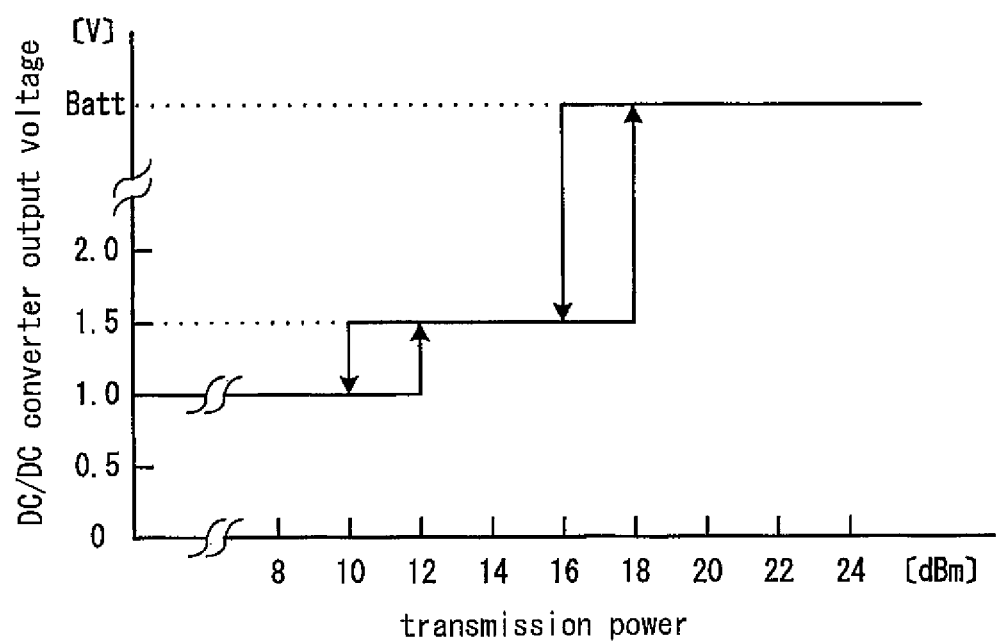
FIG. 4 shows a relation between transmission power of the power amplifier and output voltage of the DC/DC converter according to the first embodiment.

When the DC/DC converter 65 drives power amplifiers 1 and 2, the relation between output voltage of the DC/DC converter 65 and transmission power is generally as follows: if transmission power becomes small, the output voltage of the DC/DC converter 65 is set to be small as shown in FIG. 4. In general, the isolation between the main antenna 76 and the sub-antenna 91 is higher in 2 GHz band, and transmission noise coupling to the reception circuit is also reduced.

In this embodiment, the wireless communication apparatus previously sets comparing voltage applied from the control unit 15 to the comparing terminal 12 of the power amplifier 1 and comparing voltage applied from the control unit 15 to the comparing terminal (not shown) of the power amplifier 2, as shown in FIG. 5, and controls gain characteristics of power amplifiers 1 and 2 according to the hybrid operation. A comparing voltage table shown in FIG. 5 is stored, for example, in a memory included in the control unit 15.

Figure 6:
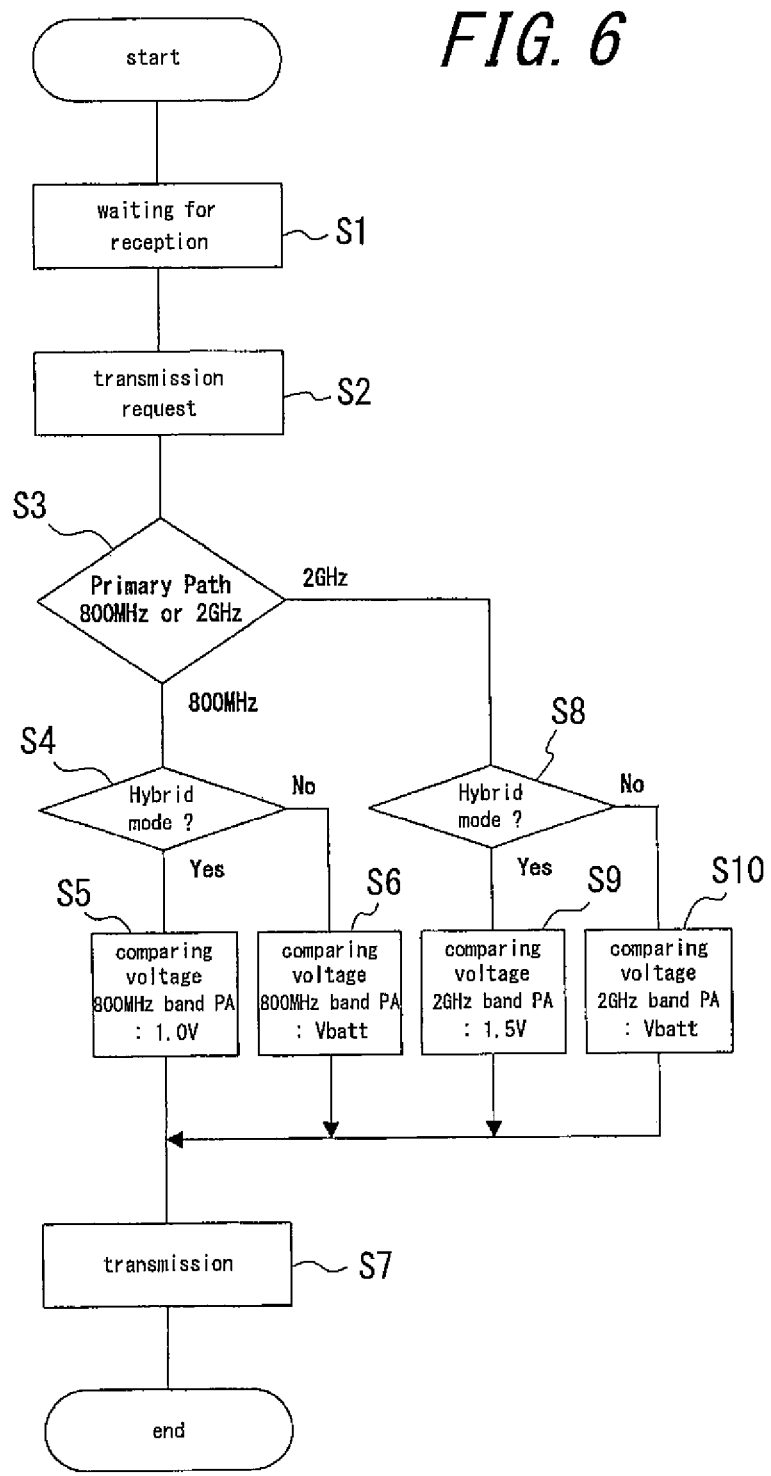
FIG. 6 is a flowchart showing process of the first embodiment.

Hereinafter, referring to a flowchart shown in FIG. 6, process of the wireless communication apparatus according to the present invention will be described.

First, if there is a transmission request (step 2) while waiting for reception (step 1), the wireless communication apparatus determines whether the transmission request is form the 800 MHz band system or the 2 GHz band system, in other words, whether a primary path is the 800 MHz band path or 2 GHz band path (step S3).

Here, when it is a transmission request in 800 MHz band, the wireless communication apparatus further determines whether it is a hybrid operation or not (step S4). If it is a hybrid operation, comparing voltage of 1.0[v] is applied from the control unit 15 to the comparing terminal 12 of the power amplifier 1 that is a power amplifier (PA) for 800 MHz band (step 5), otherwise, comparing voltage of battery voltage (Vbatt) is applied to the comparing terminal 12 (step S6). And then transmission is performed (step S7).

On the other hand, in step S3, when it is determined to be a transmission request in 2 GHz band, the wireless communication apparatus further determines whether it is a hybrid operation or not (step S8). If it is a hybrid operation, comparing voltage of 1.5 [v] is applied from the control unit 15 to the comparing terminal of the power amplifier 2 that is a power amplifier (PA) for 2 GHz band (step 9), otherwise, comparing voltage of battery voltage (Vbatt) is applied to the comparing terminal (step S10). And then transmission is performed (step S7).

Therefore, in this embodiment, as shown in FIG. 4 clearly, when a hybrid operation for transmission at 800 MHz band is performed, and if transmission power of the power amplifier 1 is above 12 [dBm], the PIN diode D1 is turned on, and the matching characteristic changing circuit 11 is connected to the output matching circuit 57, so that the gain characteristic is changed. And then, when the transmission power becomes below 10 [dBm], the PIN diode D1 is turned off, and the matching characteristic changing circuit 11 is separated from the output matching circuit 57. Accordingly, the gain characteristic returns to the original condition.

When a hybrid operation for transmission at 2 GHz band is performed, and if transmission power of the power amplifier 2 is above 18 [dBm], the PIN diode is turned on, and the matching characteristic changing circuit is connected, so that the gain characteristic is changed. And then, when the transmission power becomes below 16 [dBm], the PIN diode is turned off, and the matching characteristic changing circuit is separated from the output matching circuit. Accordingly, the gain characteristic returns to the original condition.

In this embodiment, as described above, when a hybrid operation where the secondary reception circuit of 2 GHz band system or GPS reception circuit receives a signal while the primary circuit of the 800 MHz band system transmits/receives a signal is performed, the matching characteristic of the power amplifier 1 is changed so that gain of the power amplifier 1 in the 800 MHz band system is sufficiently reduced in the reception band of 2 GHz band system and GPS reception band. Therefore, there is no need to use the filter 72 for suppressing frequency components of 2 GHz band system and the filter 73 for suppressing GPS reception frequency components in the primary circuit of 800 MHz band system shown in FIG. 19.

Similarly, when a hybrid operation where the secondary reception circuit of 800 MHz band system or GPS reception circuit receives a signal while the primary circuit of the 2 GHz band system transmits/receives a signal is performed, the matching characteristic of the power amplifier 2 is changed so that gain of the power amplifier 2 in the 2 GHz band system is sufficiently reduced in reception band of 800 MHz band system and GPS reception band. Therefore, there is no need to use the filter 82 for suppressing frequency components of 800 MHz band system and the filter 83 for suppressing GPS reception frequency components in the primary circuit of 2 GHz band system shown in FIG. 19.

Therefore, according to this embodiment, it is possible to efficiently reduce insertion loss of circuits into each primary circuit of 800 MHz band system and 2 GHz band system, and to achieve a wireless communication apparatus having smaller size, lower costs and reduced power consumption. Moreover, in this embodiment, if transmission power in the primary circuit is low, the matching characteristic changing circuit for changing gain characteristic is not connected even while a hybrid operation is performed. Therefore, it is possible to save power consumption still more, and so that the battery life is extended.

Second Embodiment

In the second embodiment of the present invention, when the PIN diode D1 of the power amplifier 1 is turned on, the wireless communication apparatus controls voltage so that voltage applied between both terminals of the PIN diode D1 is stable. The wireless communication apparatus also controls the power amplifier 2 in the same manner.

In other words, when the wireless communication apparatus uses a battery as a power source, the battery voltage varies, for example, in 3.3~4.2[V]. Thus, when output voltage of the DC/DC converter 65 is set to the battery voltage, and if the PIN diode is turned on, voltage applied to both terminals also varies. Therefore, DC resistance and capacitance between both terminals varies, so that matching condition of the matching characteristic changing circuit is changed.

In this embodiment, as shown in FIG. 7, the wireless communication apparatus previously sets a comparing voltage table corresponding to the battery voltage (Vbatt), which is input voltage of the DC/DC converter 65, and output voltage (Vdc) of the DC/DC converter 65 set by the control unit 15. While detecting battery voltage, the control unit 15 controls voltage so that voltage applied between both terminals of the PIN diodes is stable, by setting comparing voltage, when PIN diodes of the power amplifiers 1, 2 are turned on, from the comparing voltage table shown in FIG. 7 based on the battery voltage and the output voltage of the DC/DC converter 65 set according to the control signal.

Figure 8:
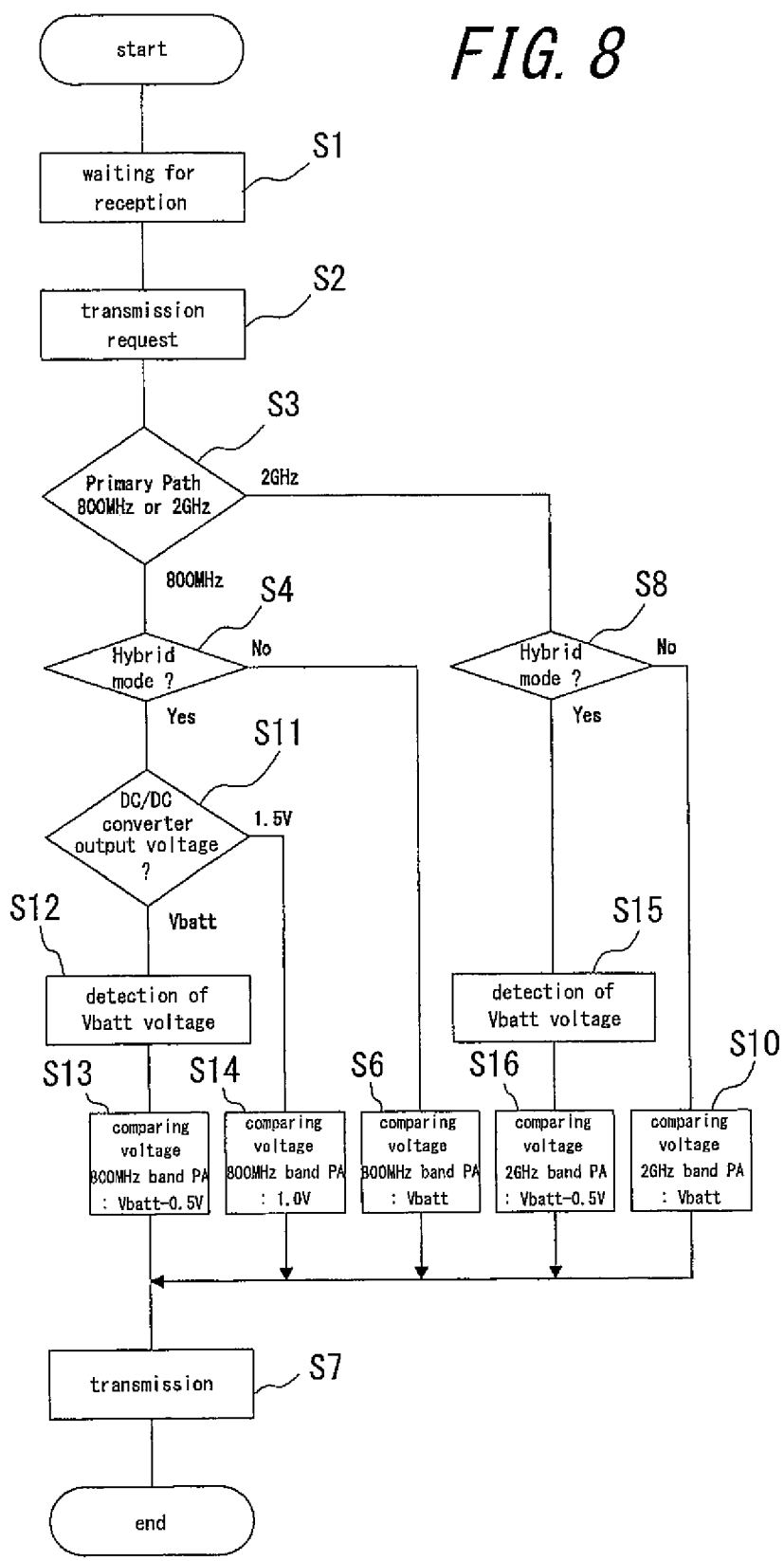
FIG. 8 is a flowchart showing process of the second embodiment.

FIG. 8 is a flowchart showing a process of the wireless communication apparatus according to this embodiment. Steps for performing the same operations with those in FIG. 6 have the same reference numerals.

In this embodiment, when the transmission request is determined as a transmission request in 800 MHz band in step S3, and further when it is determined as a hybrid operation in step S4, the wireless communication apparatus checks whether output voltage of the DC/DC converter 65 is set to 1.5 [V] or Vbatt [V] (step S11). If the output voltage of the DC/DC converter 65 is set to battery voltage (Vbatt), the wireless communication apparatus detects actual battery voltage (step S12), and makes the control unit 15 apply comparing voltage (Vbatt−0.5 [V]) calculated by subtracting 0.5 [V] from detected actual battery voltage to the comparing terminal 12 of the power amplifier 1 in 800 MHz band (step S13). If the output voltage of the DC/DC converter 65 is set to 1.5 [V], the wireless communication apparatus makes the control unit 15 apply comparing voltage of 1.0[V] to the comparing terminal 12 of the power amplifier 1 (step S14), and performs transmission in step S7.

When the transmission request is determined as a transmission request in 2 GHz band in step S3, and further when it determined as a hybrid operation in step S8, the wireless communication apparatus immediately detects the battery voltage (step S15), makes the control unit 15 apply comparing voltage (Vbatt−0.5 [V]) calculated by subtracting 0.5 [V] from detected actual battery voltage to the comparing terminal of the power amplifier 2 in 2 GHz band (step S16), and performs transmission in step S7.

As described above, in this embodiment, when PIN diodes for connecting the matching characteristic changing circuits of power amplifiers 1, 2 are turned on, since the wireless communication apparatus controls voltage so that voltages applied to both terminals of them are stable, it is possible to achieve desired gain characteristics consistently. Therefore, reliability of the apparatus is improved.

Third Embodiment

Figure 9:
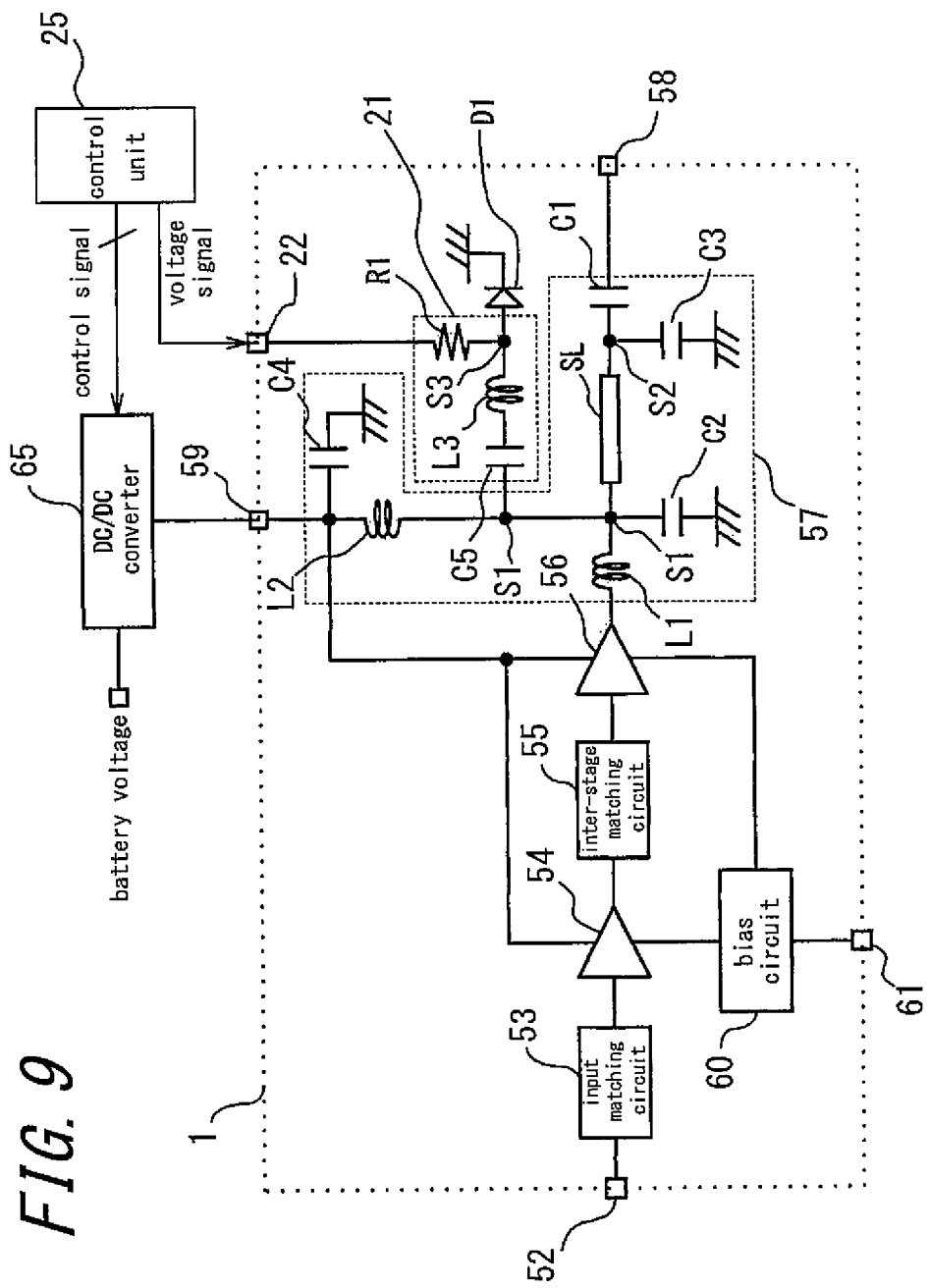
FIG. 9 is a block diagram of a main part of a cellular phone according to the third embodiment.

In a wireless communication apparatus according to the third embodiment, the power amplifier 1 in the primary circuit of the 800 MHz band system of the cellular phone shown in FIG. 1 is constructed as shown in FIG. 9.

In this embodiment, a connection point S1 of an inductor L1 and a strip line SL in an output matching circuit 57 of the power amplifier 1 is connected to ground through a capacitor C5, an inductor L3 and an anode-cathode path of a PIN diode D1. And, a connection point S3 of the inductor L3 and the PIN diode D1 is connected to a control signal terminal 22 through a current limiting resistor R1. The PIN diode D1 composes a switching unit, and the current limiting resistor R1, the inductor L3 and the capacitor C5 compose a matching characteristic changing circuit 21.

The control signal terminal 22 is connected to a control unit 25 composed of CPU and the like. The control unit 25 applies a predetermined voltage signal to the control signal terminal 22 based on a hybrid operation, so that the PIN diode D1 is controlled to be turned on/off, and a matching characteristic changing circuit 21 can be selectively connected to the output matching circuit 57. In this way, when the PIN diode is turned on, the power amplifier 1 can change its matching characteristic, gain characteristic, to be attenuated in the reception band (2110~2170 MHz) of 2 GHz band system and GPS reception band (1575.42 MHz).

The power amplifier 2 in the primary circuit of the 2 GHz band system shown in FIG. 1 is constructed similarly to the power amplifier 1 shown in FIG. 9. A matching characteristic changing circuit is provided to be selectively connectable to an output matching circuit through a PIN diode. The control unit 25 controls the PIN diode to be turned on/off based on a hybrid operation, which changes a gain characteristic of the power amplifier 2. The matching characteristic changing circuit provided to the power amplifier 2 is designed so that a sufficiently reduced amount in the reception band (843~870 MHz) of the 800 MHz band system and GPS reception band (1575.42 MHz) can be achieved, similarly to the first embodiment.

The wireless communication apparatus employs a CDMA system, so that the control unit 25 monitors reception levels and reception C/Ns of outputs of filters 78, 88 and low-noise amplifies 94, 96 shown in FIG. 1, in primary paths of the CDMA system. When the reception levels and reception C/Ns become low, in order to ensure stable communication with a base station, the wireless communication apparatus controls output voltage of the DC/DC converter 65 to increase transmission power in the primary path.

In this embodiment, when a hybrid operation is performed, the control unit 25 compares a reception level with a predetermined threshold using the monitoring result of reception level in the CDMA system. When the reception level is below the threshold, the control unit 25 connects the matching characteristic changing circuit to the output matching circuit by turning on the PIN diode provided in the corresponding power amplifier in order to increase transmission power of the power amplifier 1 or the power amplifier 2 in the primary path.

Figure 10:
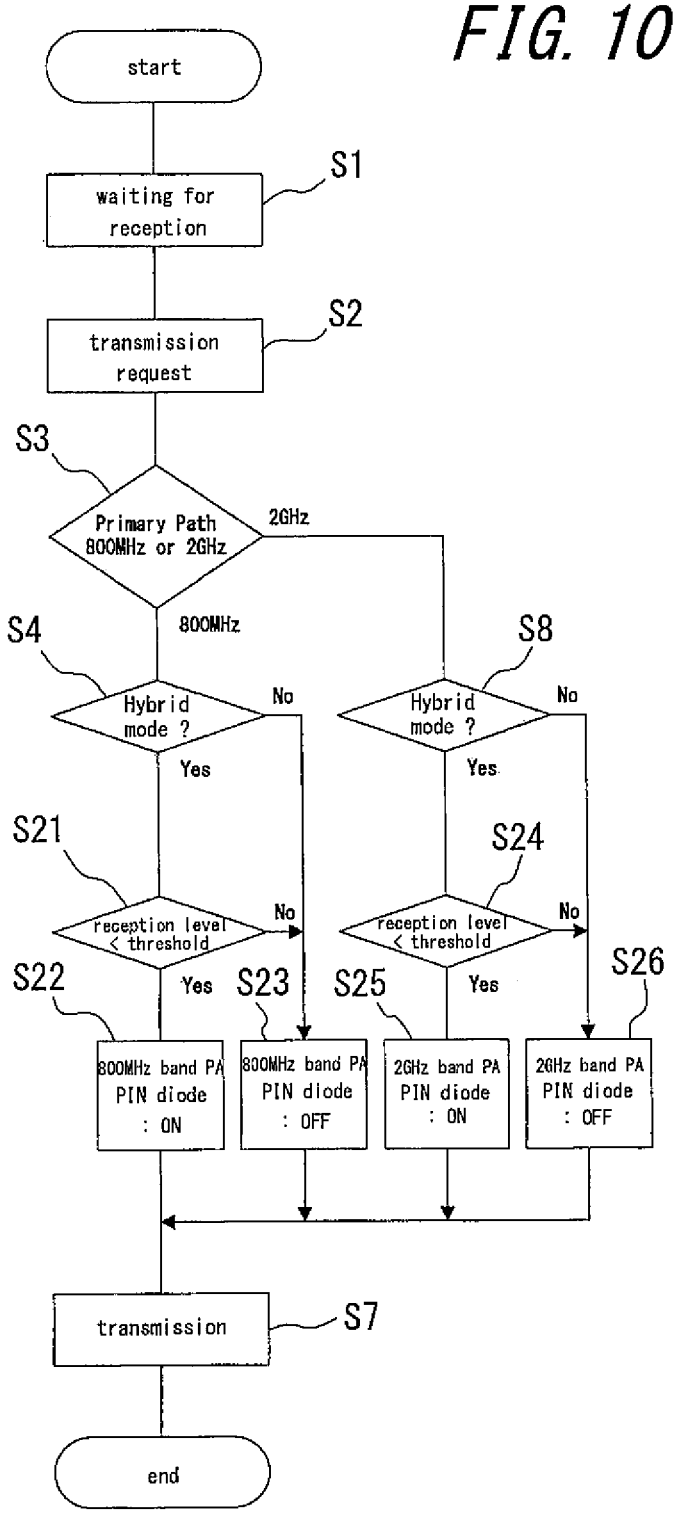
FIG. 10 is a flowchart showing process of the third embodiment.

FIG. 10 is a flowchart showing process of the wireless communication apparatus according to this embodiment. Steps for performing the same operations with those in FIG. 6 have the same reference numerals.

In this embodiment, when it is determined as a transmission request in 800 MHz band in step S3, and further when it is determined as a hybrid operation in step S4, the wireless communication apparatus determines whether a reception level at 800 MHz band is below a threshold (step S21). If the reception level at 800 MHz band is determined to be below the threshold, the wireless communication apparatus turns on the PIN diode D1 by making the control unit 25 apply a predetermined voltage signal whose level is higher than the ground potential to the control signal terminal 22 of the power amplifier 1 in 800 MHz band (step S22), and performs transmission in step S7.

When it is not determined as a hybrid operation in step S4, or when the reception level is determined to be above the threshold, the wireless communication apparatus turns off the PIN diode D1 by making the control unit 25 apply a predetermined voltage signal whose level is below the ground potential to the control signal terminal 22 of the power amplifier 1 (step S23), and performs transmission in step S7.

On the other hand, when it is determined as a transmission request in 2 GHz band, and further when it is determined as hybrid operation in step S8, the wireless communication apparatus determines whether a reception level at 2 GHz band is below a threshold (step S24). If it is determined to be below the threshold, the wireless communication apparatus turns on the PIN diode by making the control unit 25 apply a predetermined voltage signal whose level is higher than the ground potential to a control signal terminal of the power amplifier 2 in 2 GHz band (step S25), and performs transmission in step S7.

When it is not determined as a hybrid operation in step S8, or when the reception level is above the threshold in step S24, it turns off the PIN diode by making the control unit 25 apply a predetermined voltage signal whose level is below the ground potential to the control signal terminal of the power amplifier 2 (step S26), and performs transmission in step S7.

As described above, in this embodiment, when a hybrid operation is performed, and if a reception level of the primary path is below a predetermined threshold, in order to increase transmission power of a power amplifier in the primary path, the wireless communication apparatus turns on the PIN diode, and changes the matching characteristic of power amplifier in the primary path so as to reduce gain in frequency band where the secondary reception circuit receives a signal. Therefore, it is possible to acquire the same advantage with the first embodiment.

Further, in this embodiment, the wireless communication apparatus controls the PIN diode to be on/off using a reception level that the control unit 25 monitors, but it is possible to control the PIN diode similarly using a reception C/N that the control unit 25 monitors.

Fourth Embodiment

In the fourth embodiment of the present invention, the wireless communication apparatus measures an amount of transmission noise generated when the PIN diode D1 of the power amplifier 1 in the 800 MHz band is turned off, in the secondary reception circuit in 2 GHz band, and sets a transmission level threshold of 800 MHz band (transmission power threshold) [dBm] based on the measured value. Similarly, the wireless communication apparatus measures an amount of transmission noise generated when the PIN diode of the power amplifier 2 in the 2 GHz band is turned off, in the secondary reception circuit in 800 MHz band, and sets a transmission level threshold of 2 GHz band based on the measured value.

The wireless communication apparatus compares transmission levels (transmission power) actually set for power amplifiers 1 and 2 with transmission level thresholds, and make the control unit 25 control on/off of two PIN diodes of power amplifiers 1 and 2 based on the comparing results.

Here, the transmission level thresholds, for example, are set as a table in accordance with frequency and temperature, as shown in FIG. 11. In FIG. 11, it is increased, as frequency is higher, and it is decreased, as temperature is higher. FIG. 11 shows transmission level thresholds for 800 MHz band, but transmission level thresholds for 2 GHz band are similarly set as a table in accordance with frequency and temperature. Moreover, the cellular phone has a temperature sensor, and the control unit 25 detects the temperature.

Figure 12:
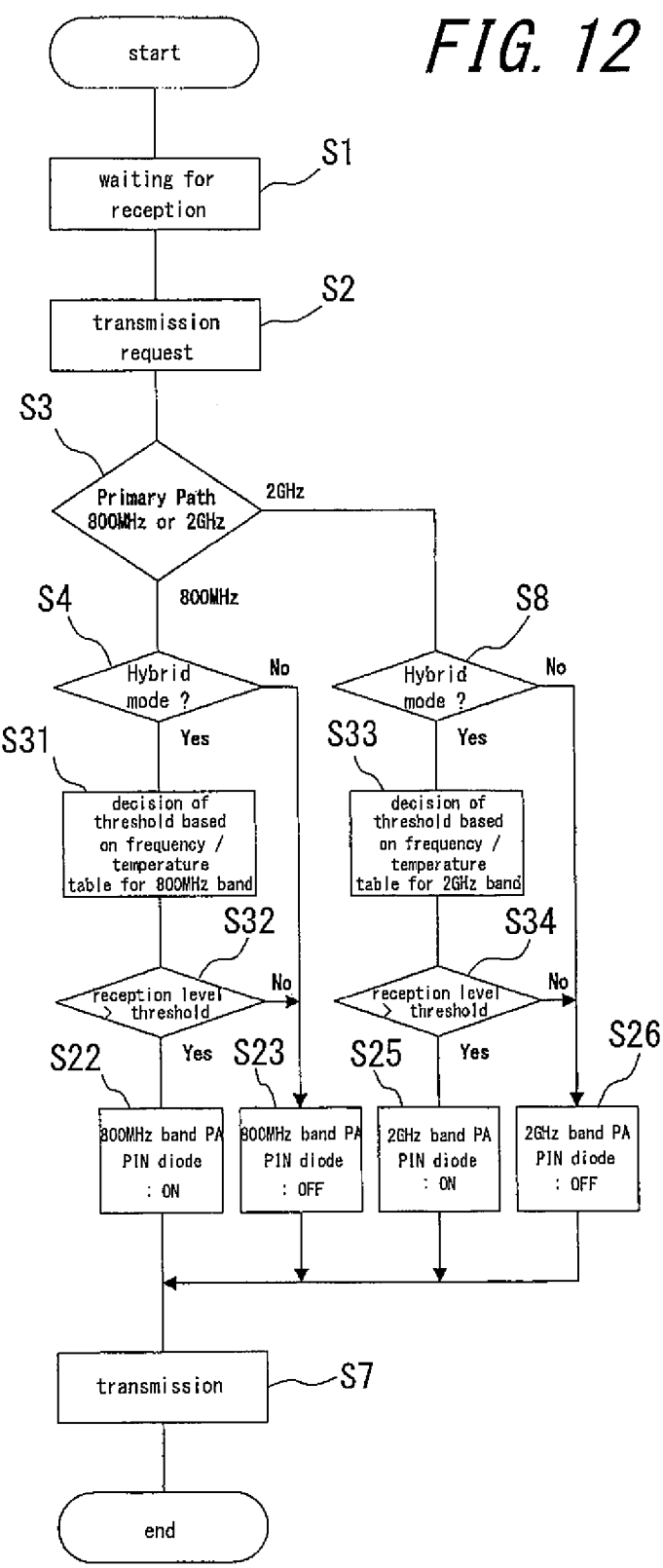
FIG. 12 is a flowchart showing process of the fourth embodiment.

FIG. 12 is a flowchart showing process of the wireless communication apparatus according to this embodiment. Steps for performing the same operations with those of FIGS. 6 and 10 have same reference numerals.

In this embodiment, when it is determined as a transmission request in 800 MHz band in step S3, and further it is determined as a hybrid operation in step S4, the wireless communication apparatus decides a transmission level threshold corresponding to transmission frequency and detected temperature from the transmission level threshold table for 800 MHz band shown in FIG. 11 (step S31), and compares it with a transmission level actually set for the power amplifier 1 (step S32).

As the result, when the transmission level actually set for the power amplifier 1 is higher than the transmission level threshold decided in step S31, the PIN diode D1 of the power amplifier 1 in 800 MHz band is turned on in step S22

(step S22), and transmission is performed in step S7. On the contrary, when the transmission level actually set for the power amplifier is lower than the transmission level threshold decided in step S31, the PIN diode D1 of the power amplifier 1 is turned off in step S23, and transmission is performed in step S7.

On the other hand, when it is determined as a transmission request in 2 GHz band in step S3, and further it is determined as a hybrid operation in step S8, the wireless communication apparatus decides a transmission level threshold corresponding to transmission frequency and detected temperature from the transmission level threshold table for 2 GHz band (step S33), and compares it with a transmission level actually set for the power amplifier 2 (step S34). As the result, when the transmission level actually set for the power amplifier 2 is higher than the transmission level threshold decided in step S33, the PIN diode of the power amplifier 2 in 2 GHz band is turned on in step S25, and when the transmission level actually set for the power amplifier 2 is lower than the transmission level threshold decided in step S33, the PIN diode of the power amplifier 2 is turned off in step S23, and then transmission is performed in step S7.

As described above, in this embodiment, the wireless communication apparatus previously measures amount of transmission noise to the secondary reception circuit in 2 GHz band generated by the power amplifier 1 in 800 MHz band, and amount of transmission noise to the secondary reception circuit in 800 MHz band generated by the power amplifier 2 in 2 GHz band, according to frequency and temperature, and makes a transmission level threshold table. When hybrid operation is performed, the control unit 25 controls on/off of two PIN diodes of power amplifiers 1, 2 based on comparing results between a transmission level actually set and a transmission level threshold in corresponding frequency and temperature of the transmission level threshold table. Therefore, it is possible to reduce power consumption efficiently according to characteristics of the apparatus.

Fifth Embodiment

A wireless communication apparatus according to the fifth embodiment of the present invention sets the transmission level threshold in the above fourth embodiment according to data rate to be lower, as the data rate is higher as shown in FIG. 13.

Figure 14:
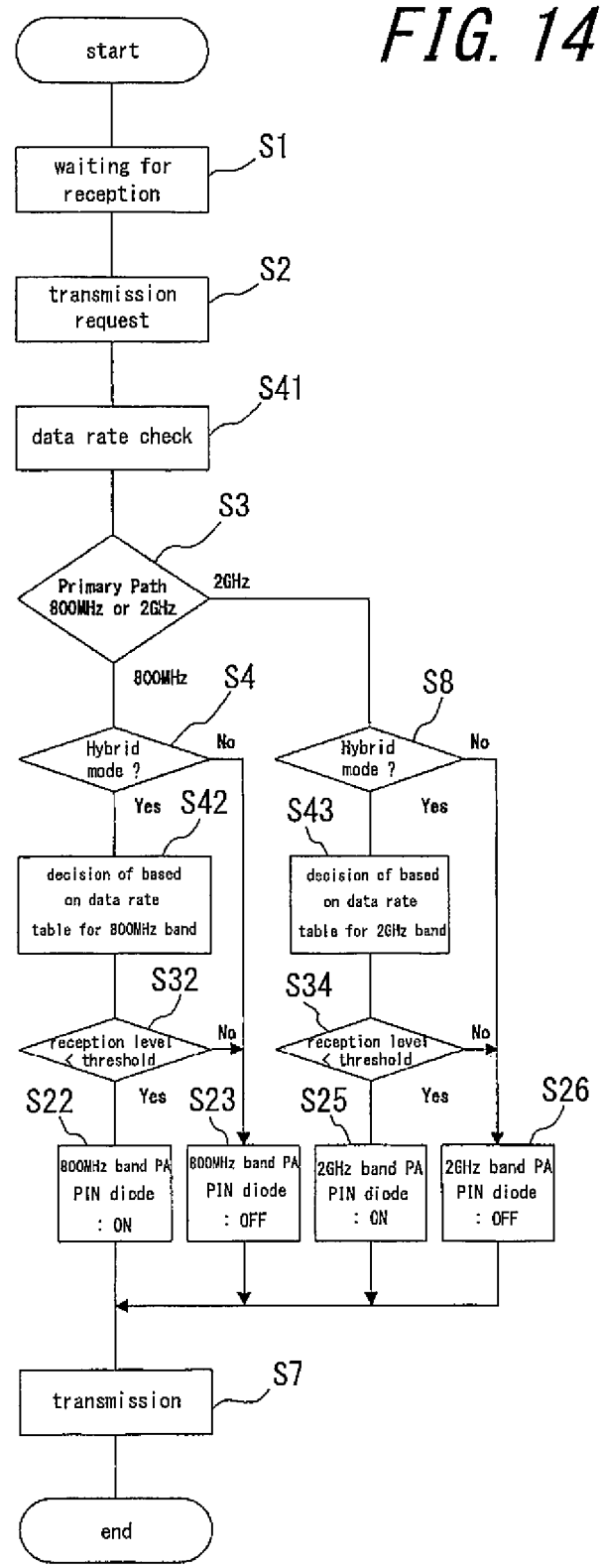
FIG. 14 is a flowchart showing process of the fifth embodiment.

FIG. 14 is a flowchart showing process of the wireless communication apparatus of this embodiment. Steps for performing the same operations with those in FIG. 12 have the same reference numerals.

In this embodiment, the wireless communication apparatus checks data rate in response to a transmission request (step S41), and when the transmission request is a transmission request in 800 MHz band, and further when it is determined as a hybrid operation, it decides a transmission level threshold corresponding to the data rate checked in step S41 (step S42), from the transmission level threshold table shown in FIG. 13. And, it compares a transmission level actually set for the power amplifier 1 with the transmission level threshold decided in step S42. As the result, when the transmission level actually set for the power amplifier 1 is above the threshold decided in step S42, it turns on the PIN diode D1 of the power amplifier 1 in step S22. When the transmission level actually set for the power amplifier 1 is below the threshold decided in step S42, it turns off the PIN diode D1 of the power amplifier 1 in step S23.

On the other hand, after checking the data rate in response to the transmission request in step S41, when the transmission request is a transmission request in 2 GHz band, and further when it is determined as a hybrid operation, the wireless communication apparatus decides a transmission level threshold corresponding to the data rate checked in step S41 (step S43), and compares it with a transmission level actually set for the power amplifier 2 (step S34). As the result, when the transmission level actually set for the power amplifier 2 is above the transmission level threshold decided in step S43, it turns on the PIN diode of the power amplifier 2 in step S25. When the transmission level actually set for the power amplifier 2 is below the transmission level threshold decided in step S43, it turns off the PIN diode of the power amplifier 2 in step S26.

In this embodiment, as shown in FIG. 13, since the transmission level threshold is set to be lower as the data rate is higher, when raising a transmission level to improve the reception C/N because the data rate is high, the wireless communication apparatus can certainly turn on the PIN diode of the power amplifier 1 or 2 on hybrid operation. Therefore, it is possible to reduce undesired noise coupled to the secondary reception circuit efficiently and certainly when a hybrid operation is performed.

Sixth Embodiment

A wireless communication apparatus according to the sixth embodiment of the present invention sets the reception level threshold in the above third embodiment according to whether there is QoS (Quality of Service) control of VoIP and the like so as to be higher when there is QoS control than that when there is no QoS control.

Figure 16:
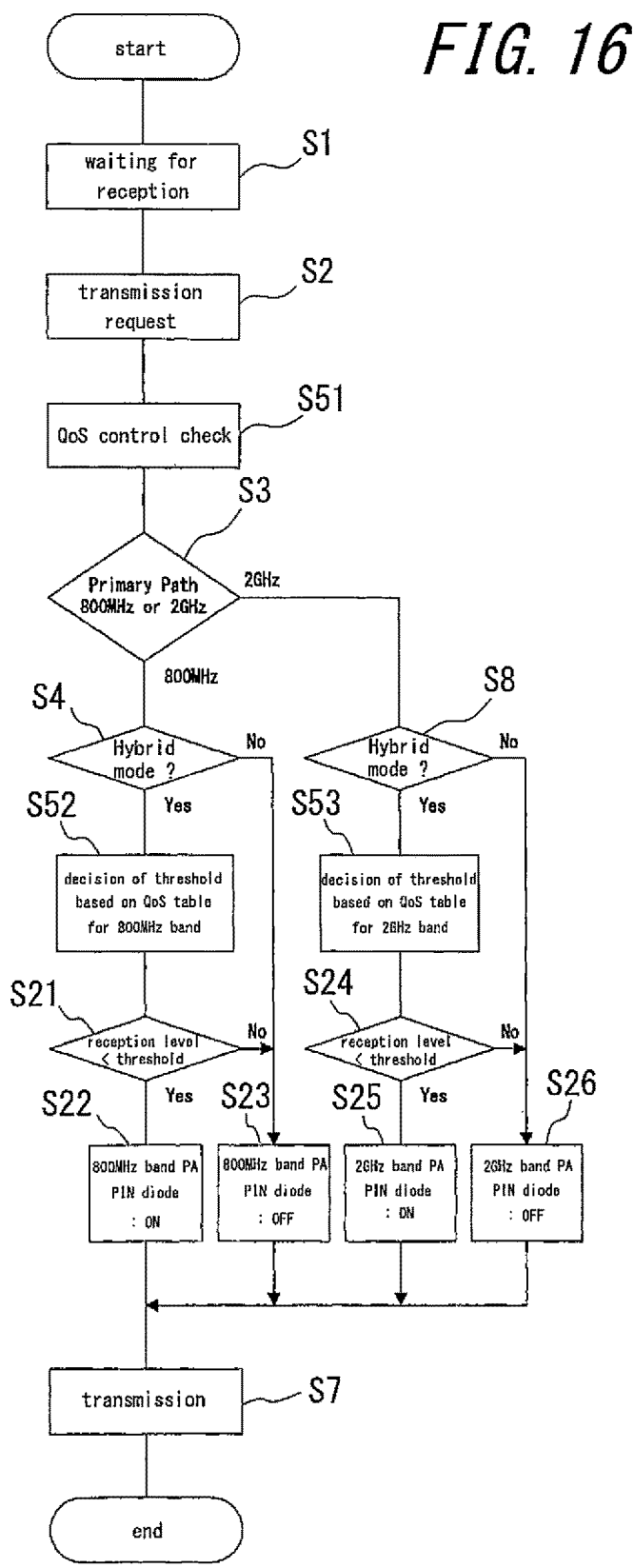
FIG. 16 is a flowchart showing process of the sixth embodiment.

FIG. 16 is a flowchart showing process of the wireless communication apparatus of this embodiment. Steps for performing the same operations with those in FIG. 10 have the same reference numerals.

In this embodiment, the wireless communication apparatus checks whether there is QoS control in response to a transmission request (step S51), and when the transmission request is a transmission request in 800 MHz band, and further when it is determined as a hybrid operation, it decides a reception level threshold corresponding to whether there is QoS control checked in step S51, from the reception level threshold table shown in FIG. 15 (step S52). Continuously, it determines whether actual reception level is below the reception level threshold decided in step S52, and when the actual reception level is below the reception level threshold decided in step S52, it turns on the PIN diode D1 of the power amplifier 1 in step S22. When the actual reception level is above the reception level threshold decided in step S52, it turns off the PIN diode D1 of the power amplifier 1 in step S23.

On the other hand, after checking whether there is QoS control in response to the transmission request in step S51, when the transmission request is a transmission request in 2 GHz band, and further when it is determined as a hybrid operation, the wireless communication apparatus decides a reception level threshold corresponding to whether there is QoS control checked in step S51, from the reception level threshold table shown in FIG. 15 (step S53), and determines whether the actual reception level is below the decided reception level threshold. As the result, when the actual reception level is below the reception level threshold decided in step S53, it turns on the PIN diode of the power amplifier 2 in step S25. When the actual reception level is above the reception level threshold decided in step S53, it turns off the PIN diode of the power amplifier 2 in step S26.

In this embodiment, since the reception level threshold, when there is QoS control, is set to be higher than that when there is no QoS control, as shown in FIG. 15, when raising the transmission level to improve the reception C/N because there is QoS control, the wireless communication apparatus can certainly turn on the PIN diode of the power amplifier 1 or 2 on hybrid operation. Therefore, it is possible to reduce undesired noise coupled to the secondary reception circuit efficiently and certainly when a hybrid operation is performed.

The present invention is not limited to the above embodiments, and many variations and modifications can be implemented. For example, in the above embodiments, the PIN diode is used as a switching unit for selectively connecting the matching characteristic changing circuit to the output matching circuit of the power amplifier, but another semiconductor switch such as diode switch, transistor switch and the like, or relay switch and the like may be used.

In addition, a plurality of matching characteristic changing circuits according to reception frequency bands where a hybrid operation can be performed may be selectively connected to output matching circuits through switching unit, respectively, and a corresponding matching characteristic changing circuit can be connected according to a reception frequency band of a hybrid operation.

Moreover, the multiband wireless communication apparatus according to the present invention is not limited to the cellular phone described in the above embodiments, but it is applicable to mobile or fixed multiband wireless communication apparatus capable of performing a hybrid operation where a reception operation is selectively performed at one frequency band while a transmission operation is performed at another frequency band.

The invention claimed is:

1. A multiband wireless communication method comprising:
  performing a transmission operation in a first frequency band with a first gain of a power amplifier, while not performing a reception operation in a second frequency band, that is different from the first frequency band;
  performing a transmission operation in the first frequency band with a second gain of the power amplifier, while performing the reception operation in a second frequency band; wherein
  the second gain is lower than the first gain, wherein
  when the reception operation is performed and a set transmission level of the power amplifier is above a transmission level threshold which is previously set, the second gain is set lower than the first gain, and wherein
  the transmission level threshold is set based on a data rate of a transmission signal by the power amplifier.

2. The multiband wireless communication method of claim 1, wherein the second gain is lower than the first gain by being synchronized with performing the reception operation.

3. A multiband wireless communication apparatus comprising:
  a transmission unit configured to transmit a signal in a first frequency band and including a power amplifier, and
  a reception unit configured to receive a signal in a second frequency band that is different from the first frequency band
  a control unit configured to:
    set a first gain to the power amplifier while the transmission unit transmits a signal in the first frequency band and the reception unit does not receive a signal in the second frequency band, and
    set a second gain to the power amplifier while the transmission unit transmits a signal in the first frequency band and the reception unit receives a signal in the second frequency band,
  wherein the second gain is lower than the first gain, wherein
  when the reception unit receives the signal and the set transmission level of the power amplifier is above a transmission level threshold which the control unit previously set, the control unit sets the second gain lower than the first gain, and
  the control unit sets the transmission level threshold based on a data rate of a transmission signal by the power amplifier.

* * * * *